(12) United States Patent
Kim et al.

(10) Patent No.: US 9,537,173 B2
(45) Date of Patent: Jan. 3, 2017

(54) POUCH TYPE LITHIUM SECONDARY BATTERY

(75) Inventors: Sang Hun Kim, Daejeon (KR); Jong Hwan Kim, Daejeon (KR); Han Ho Lee, Daejeon (KR); Jong Hyun Chae, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/259,927

(22) PCT Filed: Feb. 10, 2011

(86) PCT No.: PCT/KR2011/000903
§ 371 (c)(1),
(2), (4) Date: Sep. 23, 2011

(87) PCT Pub. No.: WO2011/099793
PCT Pub. Date: Aug. 18, 2011

(65) Prior Publication Data
US 2012/0015226 A1 Jan. 19, 2012

(30) Foreign Application Priority Data
Feb. 10, 2010 (KR) .................. 10-2010-0012290

(51) Int. Cl.
*H01M 2/10* (2006.01)
*H01M 2/02* (2006.01)
*H01M 10/052* (2010.01)

(52) U.S. Cl.
CPC .......... *H01M 10/052* (2013.01); *H01M 2/029* (2013.01); *H01M 2/0242* (2013.01);
(Continued)

(58) Field of Classification Search
CPC H01M 10/052; H01M 2/0242; H01M 2/0247;
H01M 2/0262; H01M 2/029; H01M 2/0275; H01M 2/0277; H01M 2/1077; Y02E 60/122; Y02T 10/7011
(Continued)

(56) References Cited

U.S. PATENT DOCUMENTS 6,238,813 B1 * 5/2001 Maile .................. A61N 1/378
429/176
6,455,192 B1 9/2002 Chang et al.
(Continued)

FOREIGN PATENT DOCUMENTS

CN 101262049 A 9/2008
EP 1341245 A2 9/2003
(Continued)

OTHER PUBLICATIONS

International Search Report PCT/KR2011/000903, dated Oct. 5, 2011.
(Continued)

*Primary Examiner* — Eugenia Wang
(74) *Attorney, Agent, or Firm* — Lerner, David, Littenberg, Krumholz & Mentlik, LLP (57) ABSTRACT

A pouch type lithium secondary battery including a medium- or large-sized battery module includes: a jelly-roll type electrode assembly; a resin-type first packing material that is formed of a two-layer structure having an inner resin layer and an outer resin layer, and for packing the jelly-roll type electrode assembly in the form of a unit cell; and a metal-type second packing material that integrally packs and contains two or more unit cells packed in the first packing material in the form of a module, and prevents moisture and gas penetration by a sealed structure. The pouch type lithium secondary battery is applicable particularly to medium- and large-sized batteries for EVs, p-HEVs, HEVs, and so on.

14 Claims, 6 Drawing Sheets

(52) U.S. Cl.
CPC ....... *H01M 2/0247* (2013.01); *H01M 2/0262* (2013.01); *H01M 2/0275* (2013.01); *H01M 2/0277* (2013.01); *H01M 2/1077* (2013.01); *Y02E 60/122* (2013.01); *Y02T 10/7011* (2013.01)

(58) Field of Classification Search
USPC .......................................................... 429/163
See application file for complete search history.

(56) References Cited

U.S. PATENT DOCUMENTS

| | | | | |
|---|---|---|---|---|
| 2003/0082445 | A1* | 5/2003 | Smith et al. | 429/176 |
| 2003/0091896 | A1* | 5/2003 | Watanabe | H01M 2/1077 429/158 |
| 2004/0029001 | A1* | 2/2004 | Yamazaki | H01M 2/021 429/176 |
| 2004/0110068 | A1* | 6/2004 | Seki | H01M 2/021 429/326 |
| 2004/0137321 | A1* | 7/2004 | Savaria | H01M 2/1016 429/176 |
| 2005/0031946 | A1* | 2/2005 | Kruger | H01M 2/0212 429/159 |
| 2007/0281208 | A1 | 12/2007 | Yoon et al. | |
| 2008/0160395 | A1* | 7/2008 | Okada | B60L 3/0046 429/99 |
| 2008/0182097 | A1* | 7/2008 | Mochizuki | B32B 15/08 428/317.3 |
| 2008/0220321 | A1 | 9/2008 | Yonemochi et al. | |
| 2008/0241687 | A1 | 10/2008 | Ishii et al. | |
| 2008/0292955 | A1* | 11/2008 | Byun | H01M 2/0207 429/163 |
| 2009/0004553 | A1* | 1/2009 | Nakamura | H01M 2/1077 429/54 |
| 2009/0200509 | A1* | 8/2009 | Suzuki et al. | 252/182.1 |
| 2009/0246607 | A1* | 10/2009 | Shinyashiki et al. | 429/90 |
| 2010/0285346 | A1* | 11/2010 | Graban | H01M 2/1077 429/120 |
| 2012/0015226 | A1 | 1/2012 | Kim et al. | |

FOREIGN PATENT DOCUMENTS

| | | |
|---|---|---|
| JP | S60230354 A | 11/1985 |
| JP | H02123661 A | 5/1990 |
| JP | H07232418 A | 9/1995 |
| JP | 2001-256941 A | 9/2001 |
| JP | 2001256934 A | 9/2001 |
| JP | 2006-202752 A | 8/2006 |
| JP | 2006-260975 A | 9/2006 |
| JP | 2006-339011 A | 12/2006 |
| JP | 2007173212 A | 7/2007 |
| JP | 2007-273149 A | 10/2007 |
| JP | 2007265989 A | 10/2007 |
| JP | 2007-294382 A | 11/2007 |
| JP | 2007-335309 A | 12/2007 |
| JP | 2008-053133 A | 3/2008 |
| JP | 2008-171579 A | 7/2008 |
| JP | 2008-251256 A | 10/2008 |
| JP | 2009-187889 A | 8/2009 |
| JP | 2009-289542 A | 12/2009 |
| JP | 2012527725 A | 11/2012 |
| KR | 100369070 | 6/2001 |
| KR | 20090105496 A | 10/2009 |
| WO | 2008035875 A1 | 3/2008 |

OTHER PUBLICATIONS

Extended European Search Report for Application No. 11742485 dated Oct. 17, 2013.
Office Action from Chinese Application No. 201180002599.7 dated Jul. 11, 2014.

* cited by examiner

POUCH TYPE LITHIUM SECONDARY
BATTERY

CROSS REFERENCE TO RELATED
APPLICATIONS

The present application is a national phase entry under 35 U.S.C. §371 of International Application No. PCT/KR2011/000903, filed Feb. 10, 2011, published in Korean, which claims priority from Korean Patent Application No. 10-2010-0012290, filed Feb. 10, 2010, all of which are incorporated herein by reference.

BACKGROUND OF THE INVENTION

1. Field of the Invention

The present invention relates to a pouch type lithium secondary battery which has unit cells packed in a metal outer casing in the form of a battery module.

2. Discussion of the Related Art

Generally, an electrode assembly packing material of a pouch type lithium secondary battery is formed in a multilayer film including an inner resin layer having thermal adhesion and functioning as a seal, a metal thin film layer functioning as a barrier, and an outer resin layer functioning to protect the battery from the outside. The metal thin film layer is used to prevent air, moisture, and the like from entering the interior of the battery and prevent gas generated inside the battery from leaking out, and is usually made of aluminum Al.

However, a pouch packing material of this structure may undergo external exposure of the metal thin film layer or electrical connection between the exposed metal thin film layer and an electrode lead (electrode terminal) or the like during the manufacture of a battery using the pouch packing material or during the use of the battery. For example, during the manufacture of a battery, if an excessive deformation force is locally applied or excessive thermal fusion is performed in a groove formation process for receiving an electrode assembly and an electrolyte in the pouch packing material or in a thermal fusion process for forming a sealing portion on the outer peripheral surface of the packing material, the outer resin layer or the inner resin layer may be damaged to thus expose the metal thin film layer, and the exposed metal thin film layer may be brought into electrical conduction with the battery or a metal material for another pack unit outside the battery. That is, the insulating property may be deteriorated.

Moreover, exposure of the metal thin film layer within the battery brings about a side reaction, such as peeling off the adhesive surface by causing a metal surface to be corroded by hydrofluoric acid generated by hydrolysis of lithium salt with moisture in the electrolyte.

Besides, in the groove formation (deep drawing) for receiving the electrode assembly and the electrolyte, the metal thin film layer of the pouch has low formability due to its relatively low ductility compared to the resin layer. Hence, there is a difficulty in receiving an electrode assembly of more than a predetermined thickness.

To solve these problems, there have been efforts to exclude metal layers from the pouch packing material.

For instance, Japanese Unexamined Patent Publication No. 2007-265989 discloses a battery-element package composed of a laminate film having a lamination structure of two or more resin film layers, the lamination structure having no metal foil and at least one of the resin film layers comprising a moisture absorbent material.

However, such a battery-element package is suitable for a small-sized battery. In order for the battery-element package to be used for medium and large sized batteries, each battery element needs to be packed in a package comprising a moisture absorbent material. Thus, high manufacturing costs are incurred to manufacture the battery-element package, as in the case of a conventional, high-cost metal thin film layer, and it is difficult to ensure that the penetration of gas generated internally by an abnormal chemical reaction of the battery element is prevented only by the moisture absorbent material.

On the other hand, Korean Unexamined Patent Publication No. 10-2009-0105496 discloses a laminate sheet comprising a high-strength polymer resin-based outer coating layer having excellent tensile strength, a polymer resin-based functional barrier layer capable of preventing moisture and gas penetration, and a thermally fusible polymer resin-based inner sealant layer.

However, such a polymer resin functional barrier layer is less resistant to moisture penetration compared to the conventional metal layer, requires high manufacturing costs, and has a multilayer film configuration which adds inconvenience to the process.

Consequently, the aforementioned conventional techniques exhibit very low moisture penetration resistance and gas barrier properties, and therefore have not been substantially commercialized in the industry.

Moreover, when manufacturing a pouch type lithium secondary battery module, electrode assemblies are contained in a pouch exterior material, then the pouch exterior material is thermally fused, and respective unit cells are packed further in a reinforcing material such as aluminum to obtain external strength and help heat diffusion. This poses a disadvantage in that the overall weight of the battery module increases due to the metal layer included in the pouch exterior material and the additional metal reinforcing material.

Accordingly, there has been a demand for the development of a new technique for a pouch type lithium secondary battery, which is applicable to medium and large-sized batteries, satisfies general properties, such as moisture and gas barrier properties, insulating property, formability, and prevention of peel-off due to corrosion, and is easily manufactured at low cost.

SUMMARY OF THE INVENTION

It is an object of the present invention to overcome the aforementioned problems occurring in the prior art.

The present inventors have developed, after intensive research and experiments, a pouch type lithium secondary battery, in which unit cells are packed in a metal outer casing in the form of a battery module, unlike a conventional pouch exterior material, when packing each electrode assembly, thereby preventing moisture and gas penetration. In view of this, the inventors have found that it is possible to provide a pouch type lithium secondary battery, which offers moisture and gas barrier properties, insulating property, initial performance, formability, charge-discharge properties, and high-temperature storage property at desired levels, and which is lightweight and easily manufactured at low cost.

The present invention provides a pouch type lithium secondary battery including a medium- or large-sized battery module, the pouch type lithium secondary battery including: a jelly-roll type electrode assembly; a resin-type first packing material that is formed of a two-layer structure having an inner resin layer and an outer resin layer, and for packing the jelly-roll type electrode assembly in the form of a unit cell; and a metal-type second packing material that integrally packs and contains two or more unit cells packed in the first packing material in the form of a module, and prevents moisture and gas penetration by a sealed structure.

Moreover, the inner resin layer may be made of at least one selected from polyolefin resin, polyurethane resin, and polyimide resin, be formed of two or more layers, and have a thickness of 20 to 100 μm.

In addition, the outer resin layer may be made of nylon or polyethylene terephthalate (PET), be formed of two or more layers, and have a thickness of 20 to 100 μm.

Furthermore, the second packing material may be made of aluminum or stainless steel.

Furthermore, the pouch type lithium secondary battery may further include an adhesive resin layer between the inner resin layer and the outer resin layer, and the adhesive resin layer may be made of at least one selected from polyolefin resin and polyurethane resin.

Furthermore, the pouch type lithium secondary battery of the present invention may have a lamination structure of two or more inner resin layers and two or more outer resin layers.

Since exposure of the metal layer caused by pinholes or cracks of the inner resin layer is fundamentally prevented because of the pouch packing material having the two-layer structure of the inner resin layer and the outer resin layer, the present invention provides excellent insulating property, ensures improved formability during groove formation, and reduces peel-off of the adhesive layer caused by a side reaction between the metal thin film layer and the electrolyte.

Moreover, moisture and gas barrier properties can be maintained because the electrode assemblies wrapped in the pouch packing material are packed in a separate metal outer casing in the form of a module.

Additionally, the present invention is particularly useful for medium- and large-sized batteries such as EVs, p-HEVs, and HEVs, and can enhance energy density due to light-weight material and the manufacturing process thereof can be easily carried out at low cost.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Hereinafter, the present invention will be described in more detail.

Figure 1:
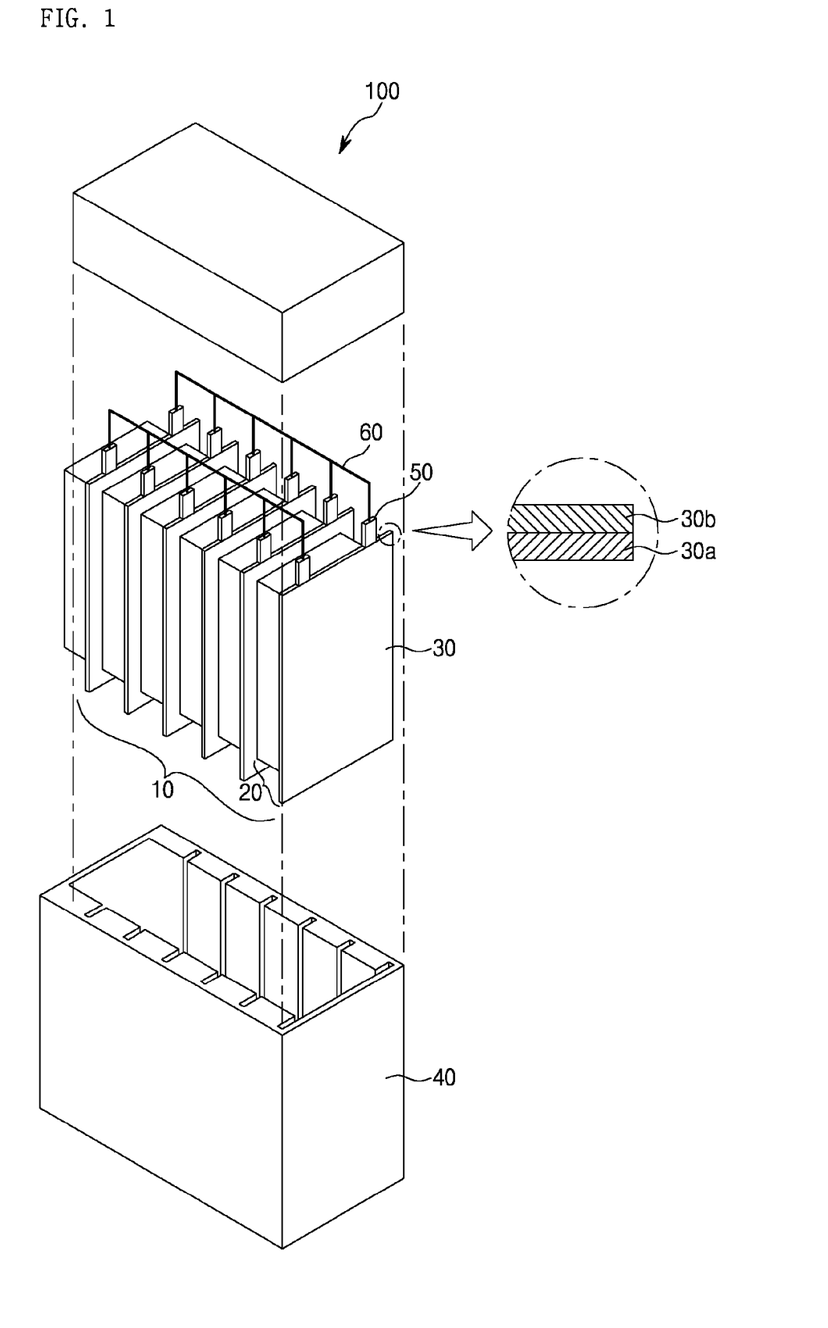
FIG. 1 shows a pouch type lithium secondary battery according to the present invention, which illustrates a battery module (single cup) having a resin-type first packing material, a metal-type second packing material, and a plurality of unit cells electrically connected together.
Figure 8:
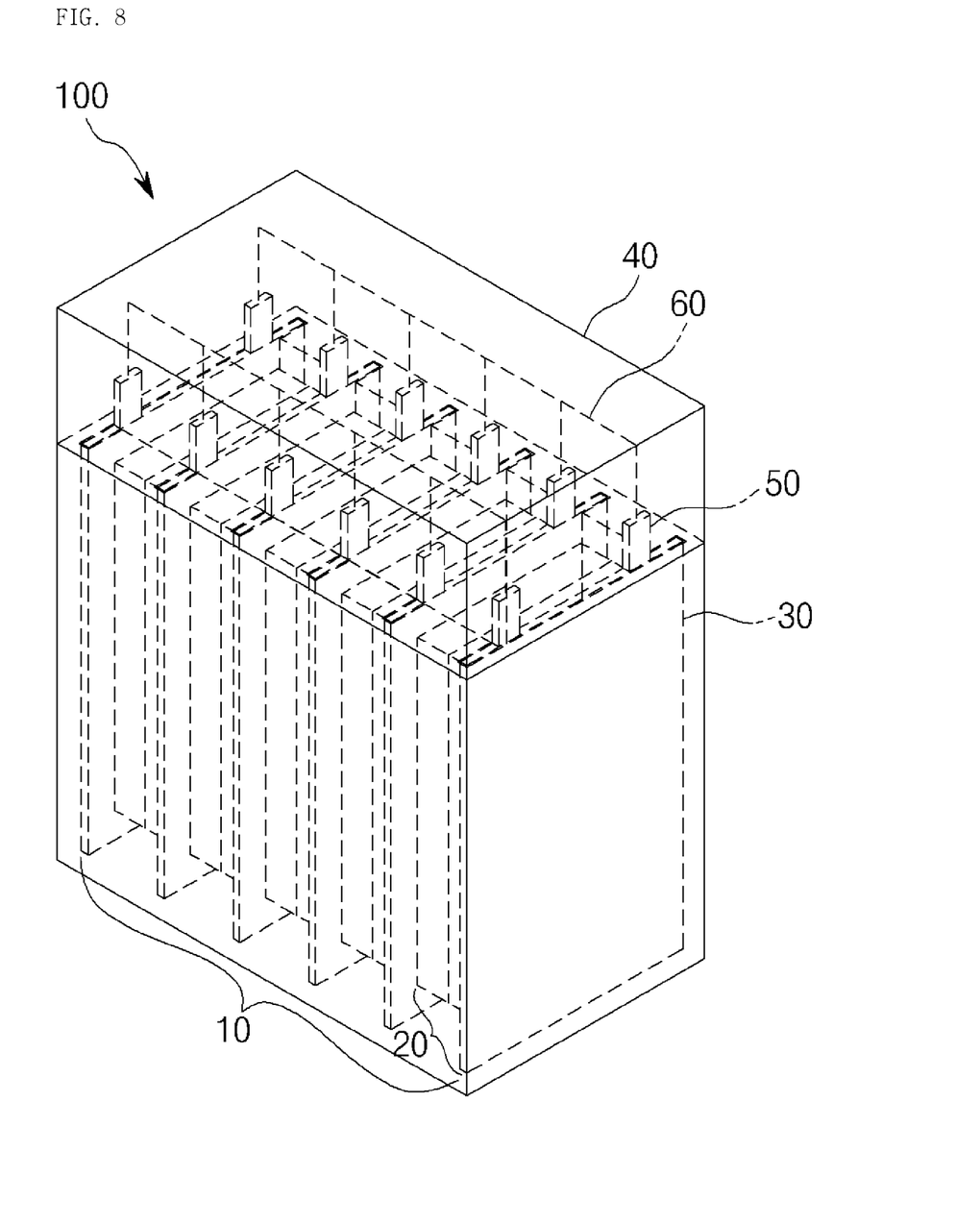
FIG. 8 shows the pouch type lithium secondary battery according to the present invention, which illustrates a structure (combination of a single cup and a double cup) in which a plurality of unit cells are completely hermetically sealed with the metal-type second packing material.

FIG. 1 shows a pouch type lithium secondary battery according to the present invention, which illustrates a battery module having a resin-type first packing material, a metal-type second packing material, and a plurality of unit cells electrically connected together. FIG. 8 shows the pouch type lithium secondary battery according to the present invention, which illustrates a structure in which a plurality of unit cells are completely hermetically sealed with the metal-type second packing material.

Referring to FIG. 1, the pouch type lithium secondary battery 100 according to the present invention comprises a jelly-roll type electrode assembly (not shown) for use in a medium- or large-sized battery and having the shape of a module 10, a resin-type first packing material 30, and a metal-type second packing material 40.

The jelly-roll type electrode assembly, which is one type of electrode assembly, is a wound electrode assembly comprising a positive electrode, a separator membrane, and a negative electrode. The jelly-roll type electrode assembly according to the present invention includes all types of jelly-roll electrode assemblies commonly used for a lithium secondary battery, and is not limited to a specific type.

The resin-type first packing material 30 is used to pack the jelly-roll type electrode assembly in the form of a unit cell, and is formed of a two-layer structure of an inner resin layer 30*a* and an outer resin layer 30*b*.

The inner resin layer 30*a* has thermal adhesion and functions as a seal, and seals the pouch by thermally fusing electrode assemblies contained therein together by applied heat and pressure. The inner resin layer 30*a* may be made of at least one selected from polyolefin-based resins such as polyethylene, polyethylene acrylic acid, and polypropylene, polyurethane resins, and polyimide resins, which have excellent chemical resistance and good sealing characteristics. Preferably, the inner resin layer 30*a* is made of cast polypropylene (CPP) with electrolyte resistance and thermal fusibility.

Moreover, the inner resin layer 30*a* may be formed of multilayers including one or two layers, or more layers in order to effectively prevent electrolyte penetration, and preferably has a thickness of 20 to 100 μm. If the inner resin layer 30*a* has too small a thickness of less than 20 μm, the electrolyte penetration prevention function and the film strength are lowered. If the inner resin layer 30a has too large a thickness of less than 100 μm, the processibility is lowered and some convenience is caused by the increase in the overall thickness of the first packing material 30.

The outer resin layer 30b functions to protect the electrode assemblies, including the jelly-roll type electrode assembly, and assists in ensuring thermal resistance and chemical resistance. Typically, a thermal resistant polymer having excellent tensile strength, resistance to moisture penetration, and resistance to air penetration. In addition, the outer resin layer 30b may be formed of multilayers including one or two layers.

The outer resin layer is preferably made of nylon (for example, cast nylon, ONy) or polyethylene terephthalate (PET) which have the above-mentioned properties and are advantageous in terms of cost. The thickness of the outer resin layer 30b is preferably within the range of 20 to 100 μm.

In the structure of the pouch type lithium secondary battery, inner resin layers and outer resin layers may be laminated regardless of the number and order of layers. Concrete examples thereof may include a lamination of inner resin layer-inner resin layer-outer resin layer-outer resin layer, a lamination of inner resin layer-inner resin layer-outer resin layer-outer resin layer-inner resin layer-inner resin layer, and a lamination of inner resin layer-outer resin layer-inner resin layer-outer resin layer. However, the configuration of the present invention is not limited to this example.

Moreover, the inner and outer parts in the structure where inner resin layers and outer resin layers are alternately laminated are divided for convenience of description based on the composition of a resin layer to help understand the present invention, and the present invention is not construed as being limited thereto.

In addition, the first packing material 30 of the present invention may further comprise, if necessary, an adhesive resin layer between the inner resin layer 30a and the outer resin layer. The adhesive resin layer is to properly attach the inner resin layer 30a and the outer resin layer 30b. The adhesive resin layer may be made of a typical polyolefin-based adhesive resin, or may be made of a urethane resin or a polyurethane resin or a combination thereof to make the processing easier.

The resin-type first packing material 30 may be manufactured in various ways, for example, by sequentially laminating an inner resin layer 30a film and an outer resin layer 30b film and then bonding them together by dry lamination or extrusion lamination.

A container portion is formed by deep drawing at one side of the manufactured first packing material 30 so that the jelly-roll type electrode assembly is seated therein, and the electrode assembly is contained therein. Next, the other side of the first packing material 30 is bent in the form of a cover and the three outer peripheral surfaces are sealed by thermal fusion, thereby manufacturing a pouch type unit cell 20 including a jelly-roll type electrode assembly packed in the first packing material 30. Alternatively, the pouch type unit cell 20 may be manufactured by manufacturing two sheets of first packing material 30, forming a container portion in one of them, and covering the other sheet of first packing material 30 to seal the four outer peripheral surfaces.

Other processes associated with the manufacture of the pouch type unit cell 20, including electrolyte injection, will be performed by employing the method known in the art.

Referring to FIG. 8, the metal-type second packing material 40 of the present invention refers to a packing material only made of metal which packs and contains two or more unit cells 20, respectively packed in the resin-type first packing material 30, integrally in the form of a module 10. The metal-type second packing material 40 functions to protect the interior of the battery from external shock as well as preventing moisture and gas penetration by a completely hermetically sealed structure.

That is, the present invention is characterized in that, in view of each unit cell 20, a plurality of unit cells 20 are integrally packed and hermetically sealed in the form of a module 10 in a metal outer casing, rather than being provided with a moisture and gas penetration prevention device.

The second packing material 30 is made of metals which are generally known in the art as having good resistance to moisture and gas penetration and being resistant to external shock. Preferably, the second packing material 30 is made of aluminum which can be made lightweight and thin and has excellent durability or stainless steel (SUS) having superior corrosion resistance.

Next, electrode leads 50 of the plurality of unit cells 20 are electrically connected via a connecting member 60, such as a bus bar, and then integrally contained in the second packing material 40. Here, the electrode leads 50 of the unit cells 20 are finally led out of the second packing material via a connecting member (not shown) for external connection through the connecting member 60 such as a bus bar, and electrically connected to an external input/output terminal (not shown).

Lastly, all openings on the second packing material 40 having the plurality of unit cells 20 contained therein are completely hermetically sealed by welding or the like, thereby manufacturing the pouch type lithium secondary battery 100.

By the way, it is preferable in the present invention that a battery is manufactured in a dry room because moisture and gas penetration cannot be prevented 100% until the plurality of unit cells 20 are contained in the second packing material 40.

The pouch type lithium secondary battery of the present invention can be applied even when the sizes of positive and negative electrode tabs are different or a distance between the positive electrode tabs and a distance between the negative electrode tabs are different.

Figure 2:
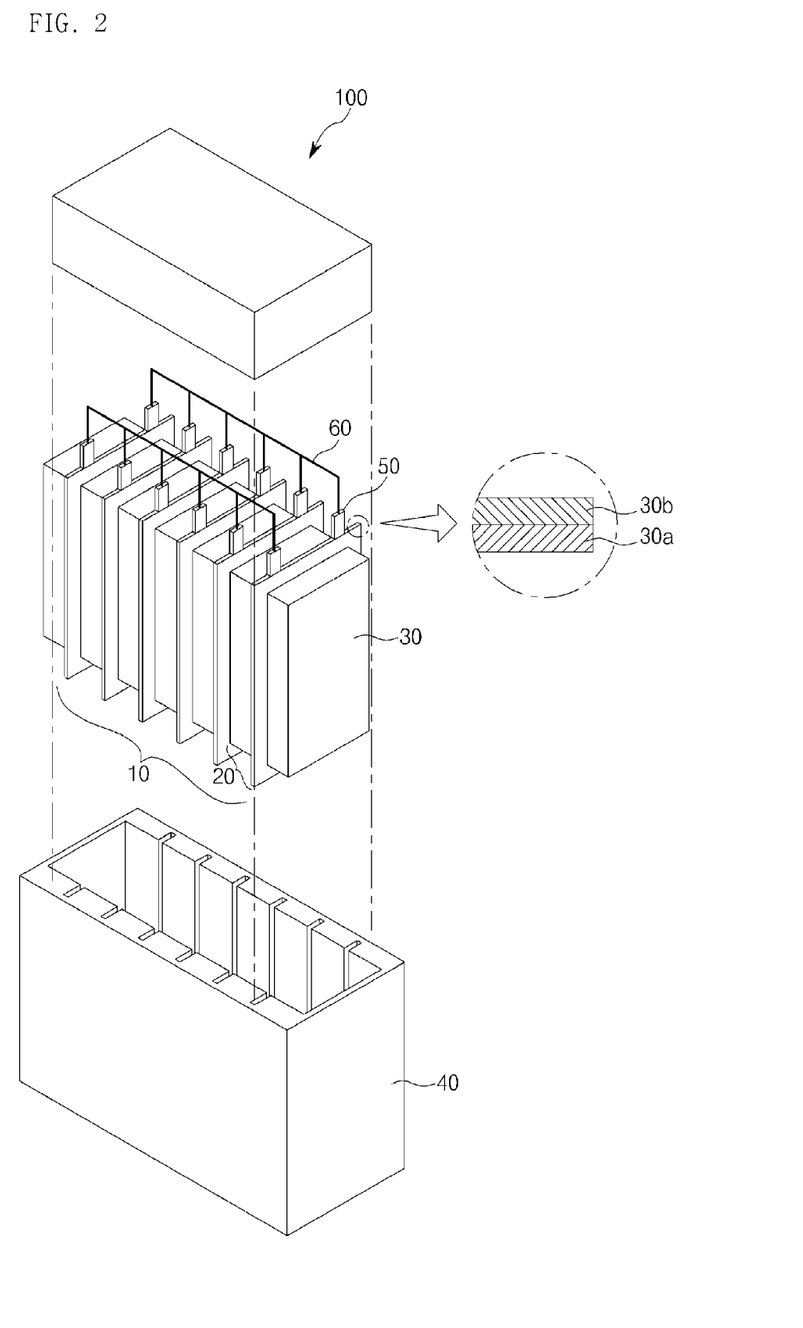
FIG. 2 shows a pouch type lithium secondary battery according to the present invention, which illustrates a battery module (double cup) having a resin-type first packing material, a metal-type second packing material, and a plurality of unit cells electrically connected together.
Figure 3:
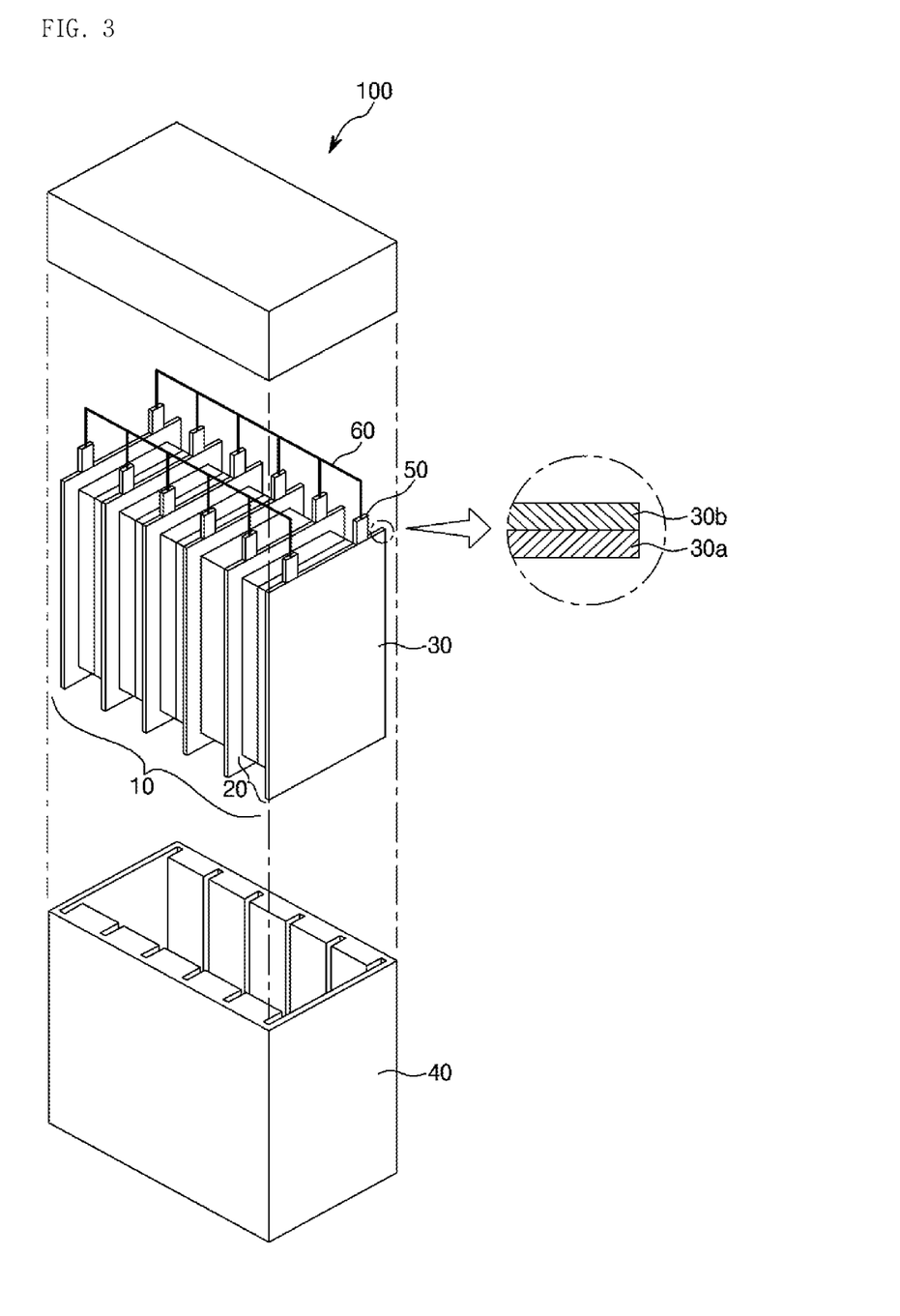
FIG. 3 shows a pouch type lithium secondary battery according to the present invention, which illustrates a battery module (combination of a single cup and a double cup) having a resin-type first packing material, a metal-type second packing material, and a plurality of unit cells electrically connected together.
Figure 4:
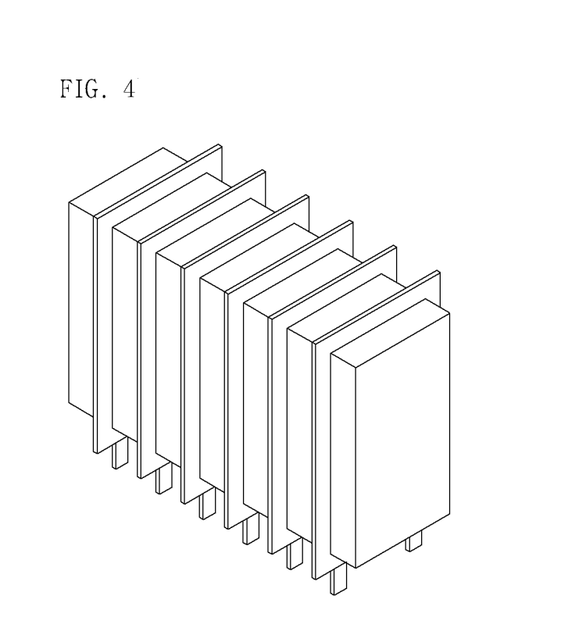
FIG. 4 illustrates a structure in which electrode leads of a battery cell (unit cell to which a double cup is applied) is disposed on the bottom surface of the battery.
Figure 5:
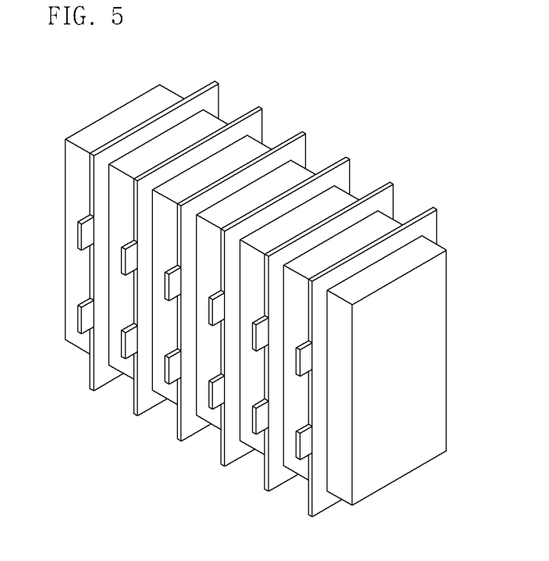
FIG. 5 illustrates a structure in which two electrode leads of a battery cell (unit cell to which a double cup is applied) are disposed on the long sides of the battery.
Figure 6:
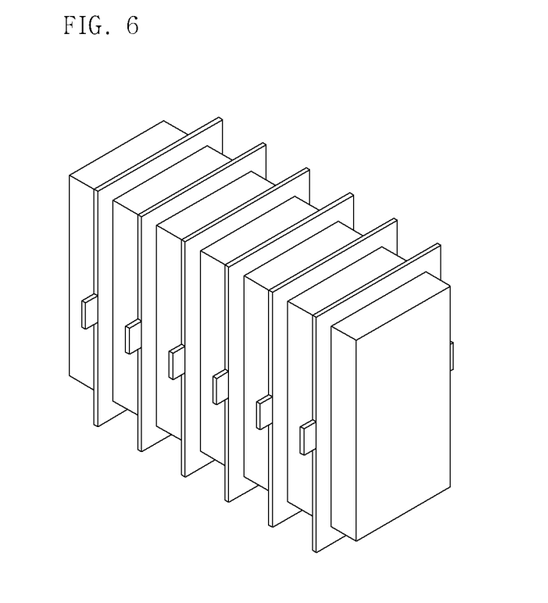
FIG. 6 illustrates a structure in which electrode leads of a battery cell (unit cell to which a double cup is applied) are respectively disposed on the right and left long sides of the battery.
Figure 7:
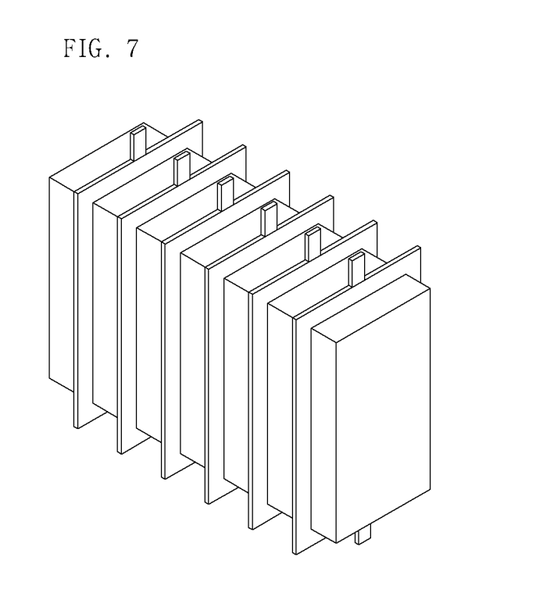
FIG. 7 illustrates a structure in which electrode leads of a battery cell (unit cell to which a double cup is applied) are respectively disposed on the top and bottom surfaces of the battery.

Moreover, the pouch type lithium secondary battery of the present invention can realize a positive electrode lead or a negative electrode lead in any direction of long and short sides of a cell as shown in FIGS. 2 to 4, as well as in the configuration shown in FIG. 1. The positive electrode lead and the negative electrode lead may be realized in different directions, as well as in one direction.

In addition, the pouch type lithium secondary battery of the present invention can be configured as a single cup as shown in FIG. 1, or a double cup as shown in FIG. 2, or a combination of a single cup and a double cup as shown in FIGS. 3 and 8. In the case of the combination, the outermost part of the battery may be configured in various shapes, including a single cup and a double cup.

The single cup and the double cup are expressions indicating the shape of the exterior of the pouch. Depending on the shape of a cross section of the pouch, which is formed by an electrode assembly contained in the pouch, the single cup refers to when the cross section of the pouch is protruded at only one side, and the double cup refers to when the cross section of the pouch is protruded at both sides. Particularly, in the manufacture of the single cup, one surface of a rectangular pouch is folded. On a sealing portion on the folded surface or on the folded surface, a distance between the electrode assembly and the outermost side of the pouch may be equal to or shorter than those on the other three surfaces. The expressions of the single cup and the double cup are merely used to help understand the cell structure of the present invention, but the invention is not construed as being limited by these terms throughout the specification.

Needless to say, the electrode assembly may be in the form of generally used electrode assemblies, such as winding type, stack type, and stack-folding type electrode assemblies, as well as the jelly-roll type electrode assembly.

Of course, the stack-folding type electrode assemblies may include various stack-folding type electrode assemblies, including electrode assemblies of the same type (positive electrode-separator membrane-negative electrode) being stacked with respect to a separator membrane and electrode assemblies of different types (positive electrode-separator membrane-positive electrode, negative electrode-separator membrane-negative electrode) being stacked and folded on the same surface or difference surfaces of the separator membrane.

EXAMPLES

Example 1

A polyethylene film with a thickness of 50 µm as an inner resin layer 30a and a nylon film with a thickness of 25 µm as an outer resin layer 30b were laminated to obtain a resin-type first packing material 30, and then a container portion was formed at one side of the resin-type first packing material 30 by deep drawing and the other side thereof is bent in the form of a cover.

Next, two jelly-roll type electrode assemblies were contained in the first packing material 30 in a dry room, a 1M LiPF6 carbonate electrolyte was injected therein, and then the outer peripheral surface of the first packing material 30 was thermally fused, thereby preparing two unit cells 20.

Next, a metal-type second packing material 40 with a thickness of 0.5 mm made of aluminum was prepared.

Next, electrode leads 50 of the two unit cells 20 were electrically connected via a bus bar 60 and integrally contained in the second packing material 40, and the bus bar 60 was finally electrically connected to an external input/output terminal (not shown) through a connecting member (not shown) for external connection.

Lastly, all openings on the second packing material 40 having the two unit cells 20 contained therein were completely hermetically sealed by welding, thereby manufacturing a pouch type lithium secondary battery 100.

Example 2

Example 2 is identical to Example 1 except that a modified polypropylene film with a thickness of 50 µm was used.

COMPARATIVE EXAMPLE

A polyethylene film with a thickness of 50 µm as an inner resin layer, an aluminum metal foil with a thickness of 50 µm as a metal layer, and a nylon film with a thickness of 25 µm as an outer resin layer were sequentially laminated to obtain a pouch exterior material, and then a container portion was formed at one side of the pouch exterior material by deep drawing and the other side thereof is bent in the form of a cover.

Next, two jelly-roll type electrode assemblies same as in Example 1 were contained in the pouch exterior material, a 1M LiPF6 carbonate electrolyte was injected therein, and then the outer peripheral surface of the pouch exterior material was thermally fused, thereby preparing two unit cells.

Next, a metal reinforcing material with a thickness of 0.5 mm made of aluminum was prepared to protect each one of the electrode assemblies (unit cells) from external shock.

Next, the metal reinforcing material was laid onto each of the surfaces of the two unit cells to enclose the unit cells without sealing them.

Lastly, electrode leads of the two unit cells were electrically connected via a bus bar and the two unit cells were contained in a battery pack exterior with a thickness of 0.5 mm made of polypropylene, and the bus bar was finally electrically connected to an external input/output terminal through a connecting member (not shown) for external connection, thereby manufacturing a pouch type lithium secondary battery.

EXPERIMENTAL EXAMPLE

Experimental Example 1

According to the Examples and Comparative Example, the insulating property, initial capacity, and initial output of a unit battery manufactured by containing one jelly-roll type electrode assembly in a first packing material (or pouch exterior material) and thermally fusing were evaluated, and the result was shown in Table 1.

The insulating property was evaluated by checking whether an electrical connection was established between metal layer and resin layer portions exposed to the corners of the pouch and a negative electrode terminal.

The initial capacity was evaluated by performing charging/discharging on the manufactured unit battery at a speed of 1 C and measuring the discharge capacity.

The initial output was evaluated by charging half the capacity of the manufactured unit battery and then discharging it with a current of 120 A for 10 seconds.

TABLE 1

| | Number of manufactured batteries (ea) | Number of batteries with poor insulating property (ea) | Battery weight (g) | Initial capacity (Ah) | Initial output (W) |
|---|---|---|---|---|---|
| Example 1 | 30 | — | 222 ± 0.2 | 5.1 ± 0.1 | 700 ± 20 |
| Example 2 | 30 | — | 225 ± 0.2 | 5.1 ± 0.1 | 700 ± 20 |
| Comparative Example | 30 | 5 | 234 ± 0.2 | 5.1 ± 0.1 | 700 ± 20 |

As seen from the table, equivalent initial performance was obtained even when the electrode assemblies are contained in the first packing material 30 according to the present invention. Moreover, no electrical conduction was observed even when the first packing material 30, being a non-conductor, comes into electrical contact with an electrode terminal of a battery cell, thus ensuring insulation. In addition, it was observed that the energy density of the battery was improved due to lightweight material.

Experimental Example 2

According to the Examples and the Comparative Example, the charge-discharge properties and high-temperature storage property of a finally obtained battery were evaluated, and the result was shown in Table 2.

The charge-discharge properties were evaluated by repeatedly charging and discharge the capacity of a secondary battery 200 times at a speed of 1 C at room temperature and checking the capacity and output.

The high-temperature storage property was evaluated by keeping the battery in a chamber of 60° C. for four weeks and checking the capacity and output.

TABLE 2

|  | Capacity (Ah) after performing charging and discharging 200 times | Output (W) after performing charging and discharging 200 times | Capacity (Ah) after high-temperature storage | Output (W) after high-temperature storage |
|---|---|---|---|---|
| Example 1 | 4.9 ± 0.1 | 630 ± 20 | 4.5 ± 0.1 | 600 ± 20 |
| Example 2 | 4.9 ± 0.1 | 650 ± 20 | 4.5 ± 0.1 | 600 ± 20 |
| Comparative Example | 4.6 ± 0.1 | 600 ± 20 | 4.3 ± 0.1 | 600 ± 20 |

As seen from the table, it was observed that the charge and discharge properties and high-temperature storage property were improved compared to a conventional pouch battery by integrally containing the unit cells in the metal-type second packing material 40 and sealing them according to the present invention.

The pouch type lithium secondary battery of the present invention is applicable to medium-sized and large-sized batteries for power tools, electric automobiles including electric vehicles (EVs), hybrid electric vehicles (HEVs), and plug-in hybrid electric vehicles (PHEVs); electric bicycles including E-bikes and E-scooters, electric golf carts, and energy storage systems.

Although the technical spirit of the invention has been described only by way of example, it would be appreciated by those skilled in the art that various changes, modifications, and substitutions might be made in this embodiment without departing from the essential features of the invention. The disclosed embodiments in the invention and the accompanying drawings are illustrated for explaining rather than limiting the technical spirit of the invention and therefore, the technical scope and spirit of the invention are not limited to these embodiments and the accompanying drawings. The scope of the invention is to be construed by the appended claims and all the technical spirit within their equivalents is to be construed to be covered by the scope of the invention.

What is claimed is:

1. A lithium secondary battery including a battery module, the lithium secondary battery comprising:
    electrode assemblies including at least one single cup unit cell, and at least one double cup unit cell;
    a resin first packing material for packing the electrode assemblies including the at least one single cup unit cell and the at least one double cup unit cell in the form of unit cells, the resin first packing material including a multi-layer structure having an inner resin layer and an outer resin layer disposed directly on one side of the inner resin layer; and
    a metal second packing material that integrally packs and contains two or more unit cells packed in the first packing material in the form of a module, the metal second packing material including stainless steel to protect the electrode assembly from external shock, the metal second packing material defining a plurality of slots for respectively receiving the two or more unit cells, openings, and at least one groove formed on an inner wall of the metal second packing material, the at least one groove being configured for receiving at least one edge of the resin first packing material;
    wherein electrode leads of the unit cells are electrically coupled via a connecting member, the electrode leads and the connecting member being integrally contained within the metal second packing material;
    wherein the openings of the metal second packing material are hermetically sealed;
    wherein the inner resin layer has a thickness of 20 to 50 μm and the outer resin layer has a thickness of 20 to 25 μm;
    wherein at least one of the inner resin layer and the outer resin layer is formed of multiple layers; and
    wherein the resin first packing material is secured to the metal second packing material by inserting each of the at least one edge of the resin first packing material into a respective one of the at least one groove.

2. The lithium secondary battery of claim 1, wherein the inner resin layer is made of at least one selected from polyolefin resin, polyurethane resin, and polyimide resin.

3. The lithium secondary battery of claim 1, wherein the outer resin layer is made of nylon or polyethylene terephthalate (PET).

4. The lithium secondary battery of claim 1, further comprising an adhesive resin layer between the inner resin layer and the outer resin layer.

5. The lithium secondary battery of claim 4, wherein the adhesive resin layer is made of at least one selected from polyolefin resin and polyurethane resin.

6. The lithium secondary battery of claim 1, wherein the connecting member is a bus bar.

7. The lithium secondary battery of claim 6, wherein the bus bar is electrically coupled to an external terminal.

8. The lithium secondary battery of claim 6, wherein the bus bar provides electrical connection across the metal second packing material from an interior of the metal second packing material to an exterior of the metal second packing material.

9. The lithium secondary battery of claim 1, wherein the electrode leads and the connecting member are hermetically sealed within the metal second packing material.

10. The lithium secondary battery of claim 1, wherein the total thickness of the inner resin layer and outer resin layer is at most 75 μm.

11. The lithium secondary battery of claim 1, wherein the inner resin layer and the outer resin layer include different materials.

12. The lithium secondary battery of claim 1, wherein the at least one groove includes two grooves formed on opposing inner walls of the metal second packing material, the two grooves being aligned with one another.

13. The lithium secondary battery of claim 1, wherein the at least one groove includes a plurality of grooves spaced apart from one another along the inner wall of the metal second packing material.

14. The lithium secondary battery of claim 1, wherein each unit cell has a first thickness, and wherein the resin first packing material forms shoulders on all four sides of the unit cells, each shoulder having a second thickness, the second thickness being less than the first thickness, the shoulders of the resin first packing material being disposed within grooves of the metal second packing material.

* * * * *